(12) United States Patent
Engelhorn et al.

(10) Patent No.: US 11,587,183 B2
(45) Date of Patent: Feb. 21, 2023

(54) SYSTEM AND METHOD FOR USING OBJECT RECOGNITION TO FACILITATE THE COLLECTION OF INSURANCE INFORMATION

(71) Applicant: STATE FARM MUTUAL AUTOMOBILE INSURANCE COMPANY, Bloomington, IL (US)

(72) Inventors: Amy Engelhorn, Normal, IL (US); Kathryn E. Knarr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/066,841

(22) Filed: Oct. 9, 2020

(65) Prior Publication Data

US 2021/0027388 A1    Jan. 28, 2021

Related U.S. Application Data

(63) Continuation of application No. 15/686,339, filed on Aug. 25, 2017, now Pat. No. 10,832,339, which is a
(Continued)

(51) Int. Cl.
*G06Q 40/00* (2012.01)
*G06Q 40/08* (2012.01)
(Continued)

(52) U.S. Cl.
CPC .......... *G06Q 40/08* (2013.01); *G06K 9/6215* (2013.01); *G06V 20/10* (2022.01)

(58) Field of Classification Search
CPC ...................................................... G06Q 40/08
(Continued)

(56) References Cited

U.S. PATENT DOCUMENTS

| 5,223,844 A | * | 6/1993 | Mansell | ................ | G01S 5/0009 |
| | | | | | 340/8.1 |
| 5,408,411 A | * | 4/1995 | Nakamura | ........ | B60W 50/0097 |
| | | | | | 701/48 |

(Continued)

OTHER PUBLICATIONS

Roof Report from Automatically Generated 3D Building Models by straight skeleton computation (Year: 2018).*
(Continued)

*Primary Examiner* — Bruce I Ebersman
(74) *Attorney, Agent, or Firm* — Marshall, Gerstein & Borun LLP

(57) ABSTRACT

A computer-implemented method includes providing a user an electronic form with a field associated with a query for which an accurate response depends upon a type of an object, processing an image of the object that the user submitted via a user-interactive control of the form to identify physical features of the object, using the identified physical features to determine the object type, providing to the user a request for confirmation of the determined object type, and, in response to receiving confirmation of the determined object type from the user, causing the client device to automatically populate the field of the electronic form within the web browser in accordance with the determined type.

12 Claims, 5 Drawing Sheets

Related U.S. Application Data continuation of application No. 14/560,411, filed on Dec. 4, 2014, now Pat. No. 9,786,011.

(60) Provisional application No. 62/044,607, filed on Sep. 2, 2014.

(51) Int. Cl.
 *G06K 9/62* (2022.01)
 *G06V 20/10* (2022.01)

(58) Field of Classification Search
 USPC .......................................................... 705/4
 See application file for complete search history.

(56) References Cited

U.S. PATENT DOCUMENTS

| | | | | |
|---|---|---|---|---|
| 7,899,591 B2* | 3/2011 | Shah | ..................... | B60W 50/00 123/406.13 |
| 8,401,878 B2* | 3/2013 | Stender | .................. | G06Q 10/10 705/4 |
| 8,494,227 B2* | 7/2013 | Prokoski | .............. | A61B 5/0064 382/270 |
| 8,712,893 B1* | 4/2014 | Brandmaier | ............ | G06F 16/51 705/35 |
| 9,495,659 B2* | 11/2016 | Shanken | ............. | G06F 21/6245 |
| 10,163,162 B1* | 12/2018 | Devereaux | ............. | G06Q 40/12 |
| 10,311,302 B2 | 6/2019 | Kottenstette et al. | | |
| 10,366,288 B1 | 7/2019 | Kottenstette et al. | | |
| 10,528,925 B2* | 1/2020 | Roach | ................ | G06Q 20/3223 |
| 10,572,944 B1* | 2/2020 | Brandmaier | ........... | G06Q 40/08 |
| 10,580,075 B1* | 3/2020 | Brandmaier | ........... | G06Q 40/08 |
| 10,643,072 B2 | 5/2020 | Kottenstette et al. | | |
| 11,151,378 B2 | 10/2021 | Kottenstette et al. | | |
| 11,210,552 B2 | 12/2021 | Kossyk et al. | | |
| 11,222,426 B2 | 1/2022 | Richter et al. | | |
| 11,232,150 B2 | 1/2022 | Vianello et al. | | |
| 11,367,265 B2 | 6/2022 | Vianello et al. | | |
| 2006/0075330 A1* | 4/2006 | Guido | ..................... | H04L 67/02 715/205 |
| 2010/0174564 A1* | 7/2010 | Stender | .................. | G06Q 10/10 709/206 |
| 2011/0090075 A1* | 4/2011 | Armitage | ............. | G07C 5/0816 340/439 |
| 2013/0073387 A1* | 3/2013 | Heath | .................... | G06Q 30/02 705/14.53 |
| 2013/0096938 A1* | 4/2013 | Stueckemann | ........ | G16H 40/60 705/2 |
| 2014/0114691 A1* | 4/2014 | Pearce | ................... | G06Q 40/08 705/4 |
| 2014/0129261 A1* | 5/2014 | Bothwell | ............... | G06N 20/00 705/4 |
| 2014/0222444 A1* | 8/2014 | Cerello | ................... | G06Q 10/00 705/2 |
| 2014/0244317 A1* | 8/2014 | Roberts | ................. | G06Q 40/08 705/4 |
| 2015/0025914 A1* | 1/2015 | Lekas | .................. | G06V 20/176 705/4 |

OTHER PUBLICATIONS

Information Extraction From Remote Sensing Images for Flood Monitoring and Damage Evaluation (Year: 2012).*
"A storage subsystem for image and records management" (Year: 1993).*
"Enhancing Workflow Automation in Insurance Underwriting Processes with Web Services and Alerts" (Year: 2007).*
McKinsey Global Initiative on AI (Year 2017).

* cited by examiner

| | |
|---|---|
| 102A | Is there a detached garage on the premises?<br>○ Yes  ○ No |
| 102B | Is there a free-standing fireplace or fireplace insert inside the dwelling?<br>○ Yes  ○ No  [SHOW US!]—104-1 |
| 102C | Does the dwelling have burglar bars protecting the windows?<br>○ Yes  ○ No  [SHOW US!]—104-2 |
| 102D | Does the dwelling have have any unrepaired damage?<br>○ Yes  ○ No |
| 102E | What kind of roof is on the dwelling?<br>○ Asphalt shingles  ○ Wood shingles  ○ Metal<br>○ Tile shingles  [SHOW US!]—104-3 |

SYSTEM AND METHOD FOR USING OBJECT RECOGNITION TO FACILITATE THE COLLECTION OF INSURANCE INFORMATION

CROSS-REFERENCE TO RELATED APPLICATIONS

This is a continuation of U.S. patent application Ser. No. 15/686,339, entitled "System and Method for Using Object Recognition to Facilitate the Collection of Insurance Information" and filed on Aug. 25, 2017, which is a continuation of U.S. patent application Ser. No. 14/560,411, entitled "System and Method for Using Object Recognition to Facilitate the Collection of Insurance Information" and filed on Dec. 4, 2014, which claims the benefit of U.S. Provisional Patent Application No. 62/044,607, entitled "System and Method for Using Object Recognition to Facilitate the Collection of Insurance Information" and filed on Sep. 2, 2014. The disclosures of each of the applications identified above is hereby incorporated herein by reference in its entirety.

FIELD OF THE DISCLOSURE

The present disclosure generally relates to insurance and, more specifically, to systems and methods for collecting insurance information associated with an existing or potential insurance policyholder/customer.

BACKGROUND

Individuals seeking a quote for an insurance policy premium, applying for coverage under a new insurance policy, or modifying an existing insurance policy generally must submit information that the insurance provider will then use to determine the appropriate premium amount. Increasingly, such information may be submitted using an electronic, on-line form. Typically, an individual enters personal information such as his or her name, birth date and address, as well as other information pertaining to the individual's house, condominium, vehicle, or other property that is (or would be) covered under the insurance policy. In some situations, however, the individual may experience difficulty in providing information that is requested by the insurance company. For example, an insurance application may ask a customer to indicate whether a fireplace in his or her home is a "free-standing fireplace," "traditional fireplace," or "insert fireplace," and the customer may be uncertain as to how to properly categorize the fireplace. As another example, a request for an insurance premium quote may ask a customer to indicate which of multiple types of construction were used for the exterior of the customer's home, and the customer may be unable to distinguish between "brick" and "brick veneer" options.

Today, a person faced with such uncertainty may have one or more options for assistance. For example, a current or potential customer may access on-line help that provides a detailed explanation of the various options, or may call, email or initiate an on-line chat with an insurance agent or help desk employee for assistance. Each of these solutions, however, has drawbacks that may lead to a sub-optimal customer experience. For example, detailed descriptions contained in on-line help may take a significant amount of time to read and understand, and in any case may be insufficient to answer the customer's question. Moreover, the customer may be reluctant or unable to contact an agent or other customer service representative for various reasons. For example, the customer may be very self-sufficient, without a phone or at a location with poor cellular service, and/or unwilling to take the time to initiate contact with an employee and wait for an answer. If the conventional techniques of providing assistance are unsuccessful for these and/or other reasons, the frustrated customer may either take a guess (and risk providing inaccurate information), or fail to provide the requested information entirely.

Similar drawbacks may present themselves in other scenarios that do not necessarily involve the use of on-line forms. If an insurance provider reviews its records and determines that additional information is needed from a particular customer regarding one or more objects (e.g., a fireplace, exterior wall, garage, roof, etc.), for example, any ensuing attempts to collect that information may consume resources of the insurance provider (e.g., agent time) and be bothersome for the customer. For example, the agent may need to call the customer and ask for the missing information and, if the customer cannot immediately supply the missing information, the customer may need to go to the location of the object(s) while receiving telephone guidance from the agent as to how the object(s) should be classified.

BRIEF SUMMARY

The present embodiments may, inter alia, provide an improved customer experience by reducing the amount of time and/or effort that existing and/or potential customers must spend providing information for insurance purposes, and/or may allow the insurance provider to more efficiently gather information needed to determine insurance ratings and/or pricing.

In one aspect, a computer-implemented method may include: (1) providing a user, by one or more processors and via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display, within the web browser, a user-interactive control that is associated with the first field; (2) receiving an image of the object that the user submitted via the user-interactive control and the Internet link; (3) processing, by one or more processors, the image of the object according to an object recognition technique to identify physical features of the object; (4) using, by one or more processors, the identified physical features to determine the type of the object, at least by comparing the physical features to physical features known to correspond to the type of the object; (5) providing to the user a request for confirmation of the determined type of the object; and/or (6) in response to receiving confirmation of the determined type of the object from the user, causing the client device to automatically populate the first field of the electronic form within the web browser in accordance with the determined type.

In another aspect, a tangible, non-transitory computer-readable medium stores instructions that, when executed by one or more processors, may cause the one or more processors to: (1) provide a user, via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display, within the web browser, a user-interactive control that is associated with the first field; (2) receive an image of the object that the user submitted via the user-interactive control and the Internet link; (3) process the image of the object according to an object recognition technique to identify physical features of the object; (4) use the identified physical features to determine the type of the object, at least by comparing the physical features to physical features known to correspond to the type of the object; (5) provide to the user a request for confirmation of the determined type of the object; and/or (6) in response to receiving confirmation of the determined type of the object from the user, cause the client device to automatically populate the first field of the electronic form within the web browser in accordance with the determined type.

In another aspect, a system includes one or more processors and memory. The memory stores instructions that, when executed by the one or more processors, may cause the system to: (1) provide a user, via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display, within the web browser, a user-interactive control that is associated with the first field; (2) receive an image of the object that the user submitted via the user-interactive control and the Internet link; (3) process the image of the object according to an object recognition technique to identify physical features of the object; (4) use the identified physical features to determine the type of the object, at least by comparing the physical features to physical features known to correspond to the type of the object; (5) provide to the user a request for confirmation of the determined type of the object; and/or (6) in response to receiving confirmation of the determined type of the object from the user, cause the client device to automatically populate the first field of the electronic form within the web browser in accordance with the determined type.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

FIG. 2 depicts an exemplary electronic insurance form providing for the submission of object images, according to one embodiment.

DETAILED DESCRIPTION

Figure 1:
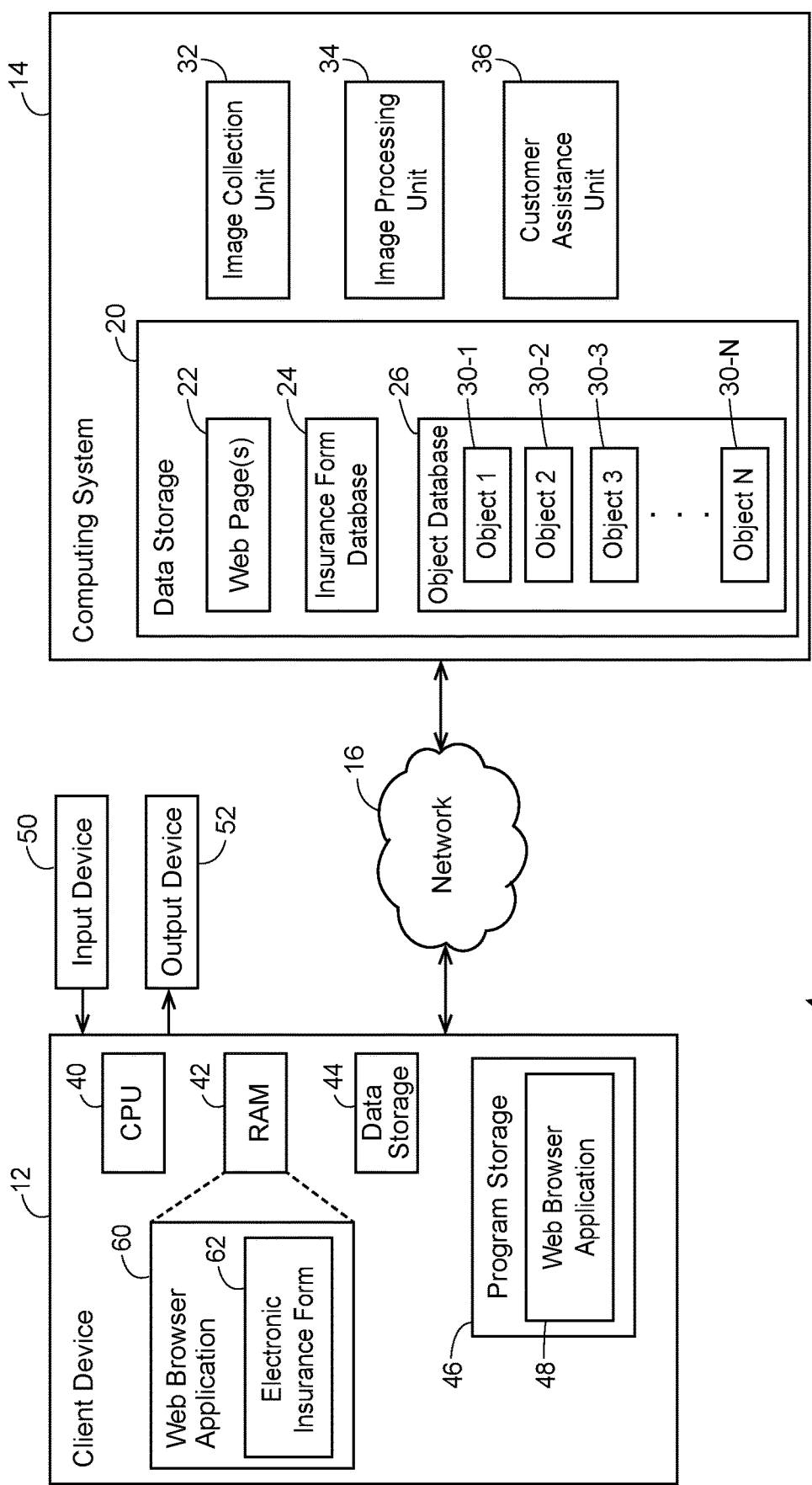
FIG. 1 depicts an exemplary environment including components associated with using object recognition to facilitate entry of information into an on-line insurance form, according to an embodiment.

The present embodiments may relate to, inter alia, pre-loss insurance policy analysis and insurance underwriting, and/or providing more appropriate insurance coverage and estimating a more accurate insurance scenario. The present embodiments may facilitate filling out insurance applications or quote requests, such as totally or partially via wireless communications sent from a customer's mobile or other computing device.

The present embodiments may provide various benefits to insurance customers. For instance, the present embodiments may alleviate instances of underinsuring customers, which may result in the customer not having enough insurance coverage to cover all of (i) the insurable features of their home, and/or (ii) their personal belongings. The present embodiments may also result in cost savings on insurance premiums for customers by alleviating instances of overinsurance. The more appropriate insurance coverage or accurate insurance scenarios may be estimated in a user friendly and efficient manner.

In one aspect, the present embodiments may use object recognition software to assist form completion. The form to be completed may be an on-line application for insurance, such as home owners, renters, automobile, or personal property insurance.

The recognition software may be used to assist in the completion of various fields within an on-line insurance application and/or request for an insurance quote. During the on-line process of completing the insurance application and/or requesting an insurance quote, the recognition software may determine, or aid in determining, a most appropriate question response. As such, the on-line process may allow a customer to potentially complete an insurance application or request for an insurance quote without having to evaluate or understand the nuances between allowed responses as typically required by an insurance professional.

The present embodiments may employ a comparison algorithm, image recognition software, an object database, and/or a set of allowed responses (or values) within a business process (e.g., completing an insurance application or quote for insurance) in order to make data selections. The insurance application or quote for insurance may be completed entirely or partially on-line, such as via a customer's mobile device, or via cross-channel communication (i.e., partially using images of insurable features or items from the customer's mobile device and partially over the telephone with an insurance representative or agent). An identification and/or comparison of an object (e.g., insurable feature of a home or personal item) against a set of known characteristics may be performed to facilitate providing more appropriate insurance coverage and/or accurate insurance quotes.

The present embodiments may be used as a decision support aid and/or assist users in making various selections during the process of completing an insurance application and/or request for a quote. Customers that lack a needed level of subject matter expertise and/or are seeking confirmation that they've made the appropriate selection (e.g., appropriate selection of various features of a home—type of roof, siding, windows, flooring, fire place, etc.) may use the tool to assist in the decision making process.

The tool may also be used as a means of alternative input during the process of filling out an insurance application or requesting a quote. Customers seeking to input responses to various questions within the application and/or quote request webpage may capture images of objects or features. After which, the tool may analyze the images, and then provide accurate values or answers to the various questions. The tool may then automatically populate an on-line insurance application and/or quote request webpage with the automatically determined accurate values or answers. Additionally or alternatively, the tool may present the customer with a suggested response for their approval, such as approval via their mobile device.

As an example, an on-line home owners insurance application may include several questions that are associated with drop down menus or choices. The present embodiments may automatically determine or suggest appropriate choices for an insurance applicant based upon analysis of images of the home or characteristics thereof. An insurance applicant may walk about a home and take pictures of various home characteristics, features, and/or equipment. The present embodiments may extract the home characteristics from the images and then compare the extracted home characteristics with a database of stored characteristics. From the comparison, the present embodiments may determine a best or most likely match, and then (a) present the most likely match to the insurance applicant for their approval, or (b) automatically fill out the on-line insurance application accordingly. Additionally or alternatively, the various home characteristics may be determined entirely or partially from accessing third party websites or on-line public records regarding houses.

Noted above, for home owners insurance, the present embodiments may analyze the images taken for various home characteristics. Those characteristics may include the type (or amount/number) of (i) home exterior (brick, masonry, siding, etc.), (ii) construction (brick patterns, veneer, etc.), (iii) garage (one, two, or three vehicle), (iv) roof (type of shingles, age, etc.) (v) basement (egress windows, size, partially finished, finished, etc.), (vi) fireplace (free standing, insert, etc.), (vii) balcony, (viii) deck, (ix) electrical system (current or voltage ratings, breaker boxes, etc.), (x) windows, (xi) doors, (xii) home square footage, (xiii) flooring, (xiv) plumbing, (xv) heating or furnace, (xvi) air conditioning, and/or other features.

In another aspect, the present embodiments, in addition to gathering insurance application information and providing insurance quotes, may also be used for post-loss insurance policy analysis. For instance, the images of an insured home after an insured event occurs may be analyzed to facilitate handling or addressing an associated insurance claim submitted by an insured, and/or may facilitate filling out an insurance claim by an insured via their mobile device.

I. Exemplary Customer Assistance Using Object Recognition

The present embodiments relate to processing images of objects to facilitate the collection of information relevant to an existing or potential insurance policy. The insurance policy may be for home insurance, condominium insurance, vehicle insurance, or personal property insurance, for example, and the collected information may include information about the contents and/or features of a property of a customer/policyholder. As used herein, and unless otherwise required by the context of the usage, the terms "customer" and "policyholder" may be used interchangeably, and may generally refer to either an existing customer or policyholder (e.g., an individual seeking a coverage change or other policy adjustment) or a potential customer or policyholder (e.g., an individual seeking a quote for a new insurance policy or applying for insurance coverage).

In a first aspect, a customer filling out an on-line form (e.g., an insurance application form, a change of coverage form, a quote request form, etc.) may submit an image of an object to a computing system of the insurance provider, and the computing system (e.g., one or more servers) may process the image in order to identify/categorize the object. The object may be any object that, under the business rules/logic of the insurance provider, is relevant to insurance ratings and/or pricing. For home insurance, for example, the object may be an exterior wall/siding, an interior wall, a roof, a fireplace, burglar bars, etc.

The customer may submit the image in an effort to obtain assistance in filling out the form. If the form asks the customer to indicate a type of fireplace in the customer's home, for example, and the customer does not know whether to select a "free-standing fireplace," "traditional fireplace," or "insert fireplace" option provided on the form, the customer may take a picture of his or her fireplace and submit the picture to the computing system. The picture may be submitted as an attachment to an email or Short Message Service (SMS) text message, using a file attachment feature embedded in the form, or in any other suitable manner. The computing system may then process the image of the fireplace according to an object recognition technique in order to determine the category to which the fireplace belongs. The processing may include identifying characteristics of the image. If an appearance-based object recognition technique is used, for example, the characteristics may be edges within the image, color and/or shading gradients of the image, etc. Alternatively, if a feature-based object recognition technique is used, the characteristics may be features of the object pictured in the image, such as a shape of the fireplace and/or a spacing between the fireplace and a wall, for example. The characteristic(s) of the image, once identified, may be compared to characteristics/criteria known to correspond to particular types of objects. In an embodiment using feature-based object recognition, for example, the computing system may determine that a fireplace in a submitted image is a free-standing fireplace if the pictured fireplace is determined to be separated from the nearest wall by some non-zero distance (and/or have a non-rectangular shape, etc.).

The computing system may then indicate the determined category/type of the object to the customer. The indication may take any of various forms, such as text within the form itself or a pop-up window, automatic population of the corresponding form field, asking the customer for confirmation of the determined type prior to automatic population, etc. Once the information is entered in the form, the customer may submit the form, or continue filling out the form if not yet complete.

In a second aspect, a computing system (e.g., one or more servers) of an insurance provider may check whether insurance records associated with customers are complete. If the computing system determines that a record associated with a customer is missing information pertaining to an object associated with the customer (e.g., a type of construction on the exterior of the customer's condominium building), the system may request an image of the object (e.g., a picture of the exterior of the building). The image may be requested from the customer, from a third party, or from an image database maintained by the insurance provider, for example.

As in the first aspect, the computing system may then process the image of the object according to an object recognition technique to determine the category/type to which the object belongs (e.g., brick, brick veneer, etc.). Once the category/type is determined, the computing system may modify the customer's insurance record accordingly. The modified record may then be used to calculate an insurance premium for the customer, or provide a premium quote to the customer, for example.

Automatically identifying/categorizing certain objects that are relevant to insurance ratings and/or pricing may substantially decrease both the burden on the customer and/or the insurance provider of collecting information, and the risk of the insurance provider receiving inaccurate information. As a result, customer satisfaction may be improved, and premiums may be determined with greater accuracy.

II. Exemplary Environment for Using Object Recognition to Facilitate the Collection of Insurance Information FIG. 1 depicts an exemplary environment 10 in which object recognition may be used to facilitate entry of information into an on-line insurance form, according to an embodiment. As illustrated in FIG. 1, the environment 10 may include a client device 12 and a computing system 14. The computing system 14 may include one or more servers of an insurance provider, such as a home, condominium, vehicle, and/or personal property insurance company, for example. The user of client device 12 may be an existing customer of the insurance provider, or a potential customer of the insurance provider, for example. In the exemplary environment 10, computing system 14 is communicatively coupled to client device 12 via a network 16. Network 16 may be a single communication network, or may include multiple communication networks of one or more types (e.g., one or more wired and/or wireless local area networks (LANs), and/or one or more wired and/or wireless wide area networks (WANs) such as the Internet). The computing system may include additional, fewer, or alternate components, including those discussed elsewhere herein.

Computing system 14 may include a data storage 20, which may include one or more types of persistent memory. Data storage 20 may store one or more web pages 22, which may include HyperText Markup Language (HTML) instructions, JavaScript instructions, JavaServer Pages (JSP) instructions, and/or any other type of instructions suitable for defining the content and presentation of the web page(s) 22. The web page(s) 22 may include a "home page" of the insurance provider that acts as an initial entry point for customers, for example, as well as one or more additional pages that may be navigated to find various kinds of information relating to the insurance services of the insurance provider. Distributed among one or more of web page(s) 22 may be references to various insurance forms, such as application forms for opening a new account, forms for changing existing coverage, and/or forms for obtaining an insurance premium quote, for example.

In the exemplary environment 10, each of the references, when activated by users visiting web page(s) 22, may cause the respective insurance form to be retrieved from an insurance form database 24 within data storage 20. Each of the insurance forms in insurance form database 24 may be an electronic file that conforms to a particular file format (e.g., PDF, XML-based, HTML, etc.), and may include instructions that both define the content and presentation of the form and support/define interactive features provided by the form. For example, each of the files may include instructions that define a plurality of fields for information to be entered by a customer, the location of the fields, the text/descriptors associated with the fields, rules for valid entries within one or more of the fields, messages to be displayed next to the fields in response to detecting invalid entries, etc. One or more of the files may also include instructions for performing various actions, such as performing a table lookup based on information entered in a field, submitting the form to a remote server (e.g., posting information entered in the form fields to a server of computing system 14), electronically signing the form, printing the form, reviewing and/or validating form field entry information, etc. In some embodiments, and as described in more detail below, at least one of the files may also include instructions for providing, within the form, a mechanism that allows a customer filling the form to submit/upload images of one or more objects.

In the exemplary environment 10, data storage 20 may also store an object database 26 containing object data sets 30-1 through 30-N(N being an integer equal to or greater than one). Each of object data sets 30-1 through 30-N may correspond to a different object type, and may include data representing a digital image of a known specimen of that object type, and/or data representing one or more known features of that object type. For example, object data set 30-1 may correspond to an exterior wall with brick construction, and may include an image of one or more walls known to have brick construction, and/or data representing one or more brick patterns common to brick construction, data representing one or more balcony types commonly used with brick construction, and/or data representing one or more other characteristics/features (e.g., the presence of header bricks, the presence of reinforced arches around windows, etc.). As another example, object data set 30-2 may correspond to an exterior wall with brick veneer construction, and may include an image of one or more walls known to have brick veneer construction, and/or data representing one or more brick patterns common to brick veneer construction, data representing one or more balcony types commonly used with brick veneer construction, and/or data representing one or more other characteristics/features (e.g., the lack of header bricks, the lack of reinforced arches around windows, etc.). As yet another example, object data set 30-3 may correspond to a free-standing fireplace, and may include an image of a fireplace known to be of the free-standing variety, and/or data indicating the presence of a non-zero spacing between the fireplace and the nearest wall for a free-standing fireplace, data representing a shape or set of shapes common to free-standing fireplaces, etc. As still another example, object data set 30-N may correspond to a fuse box having a particular ampere rating, and may include an image of a fuse box known to contain fuses having that ampere rating, and/or data representing relative dimensions and/or a shape of fuses having that ampere rating. In some embodiments in which the object data sets 30 include data representing known object features rather than images, the data includes data that was derived from images of actual objects known to correspond to the object type. Alternatively, the object features may have been manually entered based upon definitions of the corresponding object types.

In the exemplary environment 10, computing system 14 may also include an image collection unit 32, an image processing unit 34, and a customer assistance unit 36. Generally, in an embodiment, image collection unit 32 collects images of objects relevant to insurance rating and/or pricing for customers (e.g., objects within, or forming a part of, the home or vehicle of a customer), image processing unit 34 processes those images using an object recognition technique to identify/categorize the objects in the images, and customer assistance unit 36 uses the category/type of the object learned by image processing unit 34 to provide the customer with information that facilitates completion of an electronic insurance form. The operation of units 32, 34 and 36 will be described in more detail below. In an embodiment, each of units 32, 34 and 36 is (or includes) a respective set of one or more processors that executes software instructions to perform the functions described below. Alternatively, each of some or all of the units 32, 34 and 36 may be a component of software that is stored on a computer-readable medium (e.g., a random access memory (RAM) and/or ROM of computing system 14) and executed by one or more processors of computing system 14 to perform the functions described below.

While many customers and client devices may access web page(s) 22, for clarity FIG. 1 illustrates only the client device 12 of a single customer. As illustrated in FIG. 1, client device 12 may include a central processing unit (CPU) 40 to execute computer-readable instructions, a random access memory (RAM) 42 to store data and instructions during operation of programs, a data storage 44 that includes persistent memory to store data used by the programs executed by CPU 40, and a program storage 46 that includes persistent memory to store the programs executed by CPU 40, including at least a web browser application 48. By way of example, the data storage 44 and/or the program storage 46 may be implemented on a hard disk drive coupled to CPU 40 via a bus (not shown). More generally, the components 40, 42, 44 and 46 may be implemented in any suitable manner according to known techniques. Client device 12 may be a personal computer (e.g., desktop, laptop, notebook), or any other suitable stationary or portable computing device, such as a tablet, phablet or smartphone, other mobile or computing device, smart glasses, wearable electronics, for example. While client device 12 in the example of FIG. 1 may include both storage and processing components, in other embodiments client device 12 is a so-called "thin" client that depends on another computing device for certain computing and/or storage functions. For example, in some embodiments, data storage 44 and/or program storage 46 is/are external to client device 12 and is/are connected to client device 12 via a network link.

Further, client device 12 may be coupled to an input device 50 that allows the customer to enter inputs to client device 12 and an output device 52 that allows the customer to view outputs/displays generated by client device 12. The input device 50 may be a pointing device such as a mouse, keyboard, trackball device, digitizing tablet, or microphone, for example. The output device 52 may be a display monitor, for example. In one embodiment, input device 50 and output device 52 are integrated as parts of a single device (e.g., a touchscreen device). Using the input device 50 and the output device 52, a customer can interact with a graphical user interface (GUI) of the client device 12.

When CPU 40 executes the web browser application 48, RAM 42 may temporarily store the instructions and data required for its execution. In FIG. 1, the web browser application 48 being executed is represented in the program space of RAM 42 as web browser application 60. The exemplary embodiment of FIG. 1 shows the program space of RAM 42 as the program space may exist after the user has clicked on a reference in web page(s) 22 to select an insurance form in the insurance form database 24. At that time, the computing system 14 may have provided the selected insurance form to client device 12 such that the instructions of the insurance form are interpreted by the web browser application 60. In FIG. 1, the selected form is represented in the program space of RAM 42 as the electronic insurance form 62.

When executing the instructions of the electronic insurance form 62, the web browser application 60 may cause output device 52 to display the electronic insurance form 62 (e.g., the fields, text, etc. of electronic insurance form 62). In some embodiments, the web browser application 60 may use a plug-in, extension, or other software component that extends the functionality of the web browser application 62 (e.g., a PDF reader plug-in) in order to display the electronic insurance form 62 to the customer on output device 52. The electronic insurance form 62 may include a number of fields each requesting that the customer enter a particular piece of information, such as name, gender, age, etc. Moreover, one or more of the fields may request information that depends upon the category/type of one or more objects associated with (e.g., owned by) the customer. For example, a field may request that the customer indicate the type of fireplace in the customer's home (e.g., by selecting from among two or more options provided by the form, or by entering text in a designated location on the form, etc.). As another example, a field may request that the customer indicate whether the customer has burglar bars installed on the windows of his or her home (e.g., by checking a box next to "yes" text or a box next to "no" text). As yet another example, a field may request that the customer indicate whether the exterior of the customer's home has brick construction, and then, if the customer checks a "yes" box, present another field requesting that the customer indicate whether the brick construction is "brick veneer."

In some embodiments, the electronic insurance form 62 may include not only a number of fields requesting information, but also one or more interactive controls that allow the customer to upload digital images (e.g., photographs) to the computing system 14. Each interactive control may be associated with a different one of the fields of the electronic insurance form 62, for example. Alternatively, a single interactive control may allow the customer to upload images relevant to any of multiple fields within the electronic insurance form 62. As discussed further below, the customer may use the interactive control(s) to upload the images when seeking assistance in providing the requested information.

In operation, a customer using client device 12 may use the web browser application 60 to access, via network 16 (e.g., the Internet), web page(s) 22 of the computing system 14. By navigating to the appropriate one of web page(s) 22, the customer may then select (e.g., click on) a reference to a desired insurance form, such as an insurance application form or a quote request form, for example. The computing system 14 may then retrieve the selected form (here, electronic insurance form 62) from interactive form database 24 and make the electronic insurance form 62 available to the customer via web browser application 60. For example, the customer may view and interact with the electronic insurance form 62 using output device 52 and input device 50.

As noted above, the electronic insurance form 62 may include one or more fields that request information about, or information otherwise dependent on the type of, an object associated with the customer (e.g., an object owned by the customer, leased by the customer, etc.). When the customer encounters a question/field that requests such information, and is uncertain as to the correct answer, the customer may, in at least some cases, provide an image of the object to the computing system 14 in an effort to seek assistance. For example, if the electronic insurance form 62 asks that the customer to enter an ampere rating for fuses in a fuse box of the customer's home, the customer may take a picture of the opened fuse box (e.g., using a smartphone or tablet camera) and send the picture to the computing system 14. As another example, if the electronic insurance form 62 asks that the customer choose one of multiple options indicating a roof type (e.g., "wood shingles," "asphalt shingles," "metal," etc.), the customer may take a picture of a portion of the roof and send the picture to the computing system 14.

In some embodiments, the electronic insurance form 62 may provide an indication of those questions/fields for which images may be submitted to access help. For example, each such question/field may be accompanied by an interactive control that allows the customer to browse directories stored in client device 12 (e.g., in data storage 44 or another memory), select one or more digital images of the relevant object, and/or submit the image(s) to computing system 14 via network 16. Alternatively, each such question/field may be accompanied by a text and/or graphical indicator (e.g., a camera icon in a circle, or an asterisk with a corresponding explanation at the bottom of the form, etc.), and the electronic insurance form 62 may include (e.g., at the bottom of the form) a single interactive control that allows the customer to browse directories, select one or more digital images of the relevant object(s), and submit the image(s). In yet another embodiment, the customer may use input device 50 and client device 12 to send an email to an address associated with computing system 14, or to send an SMS text message to a phone number associated with computing system 14, with the digital image(s) of the relevant object(s) attached to the email or text message. The email or text message may also include text indicating the purpose of the image(s) to a human operator associated with the insurance provider, or may include one or more keywords or codes (e.g., in the subject line) that cause the computing system 14 to automatically recognize the attachments as images of objects being sent for purposes of obtaining help with the electronic insurance form 62.

In an embodiment, image collection unit 32 of computing system 14 receives the images sent from client device 12. In an embodiment where the electronic insurance form 62 includes one or more interactive controls for submitting images, for example, the electronic insurance form 62 may post the images to a server containing or executing image collection unit 32. As another example, in embodiments where the customer instead sends the images by email or text message, the image collection unit 32 may be associated with an email address or phone number, respectively, and may automatically retrieve images sent to that email address or phone number. Alternatively, a human operator may receive the email or text message, and manually provide the image to image collection unit 32.

Once an image or set of images are received (directly or indirectly) from client device 12, image collection unit 32 may provide the image to image processing unit 34. Image processing unit 34 may then process the image in order to identify one or more characteristics of the image, which may in turn be used to determine a type of the object in the image. To this end, the image processing unit 34 may use any suitable object recognition technique(s), such as a feature-based object recognition technique and/or an appearance-based object recognition technique, for example. In some embodiments and/or scenarios where the submitted image(s) include(s) metadata, the image processing unit 34 may also process the metadata to verify that the image(s) was/were taken at the home of the customer. For example, the metadata may include location information that allows the image processing unit 34 to determine the address at which the image(s) was/were taken, and the address may be compared to the known address of the customer.

In some embodiments in which feature-based object recognition is used, the characteristic(s) determined by image processing unit 34 is/are features of the pictured object, which may be compared to features known to be associated with one or more particular object types. In one embodiment and scenario where the customer submits a picture of a set of bars on a window, for example, the image processing unit 34 may determine that the bars are uniformly spaced, and have less than a certain ratio between the bar spacing and the bar width/diameter, and based upon those features conclude that the bars are burglar bars. In another example embodiment/scenario where the customer submits a picture of an exterior wall of his or her residence, the image processing unit 34 may determine that bricks of the wall are arranged in a particular pattern, and that some of the bricks appear to be approximately half as wide as other bricks (e.g., indicating that some bricks are oriented as header bricks), and based upon those features conclude that the wall uses brick construction rather than brick veneer construction. In yet another example embodiment/scenario where the customer submits a picture of a fuse box, the image processing unit 34 may determine that fuses in the fuse box have a particular set of relative dimensions (e.g., length-to-width ratio), and based upon that feature conclude that the fuse box and/or fuses is/are configured for a particular ampere rating.

Alternatively, in some embodiments where appearance-based object recognition is used, the characteristic(s) determined by image processing unit 34 is/are lower-level characteristics of the image itself. For example, the characteristics may include edges in the image, image gradients, grayscale information for the image, etc. Image processing unit 34, or another processing unit not shown in FIG. 1, may also determine characteristics for one or more "stock" images of objects that are known to correspond to a particular object type (e.g., images included in one of object data sets 30), and compare (e.g., correlate) the characteristics of the submitted image with the characteristics of the stock image(s) to determine whether the object in the submitted image is of the same type as the object(s) in the stock image(s).

The image processing unit 34 may use data provided by image collection unit 32 to determine which of object data sets 30-1 through 30-N should be used for the comparison(s) with the submitted image characteristics (e.g., which set(s) of object features should be used, and/or which stock image(s) should be used). If the customer submits the image using an interactive control associated with a particular field, for example, the instructions of the electronic insurance form 62 may post the submitted image to computing system 14 along with an indicator of the field type, and the image collection unit 32 may then forward that indicator to image processing unit 34. Image processing unit 34 may then use the indicator to determine the general category of the object in the submitted image (e.g., fireplace, roof, exterior wall, etc.). Once the general category is determined, the image processing unit 34 may select only those data sets, of object data sets 30-1 through 30-N, that correspond to objects in that general category. If the image processing unit 34 uses an indicator to determine that a submitted image is generally an image of a fireplace, for example, the image processing unit 34 may select only those data sets representing features of, or data sets containing digital images of, fireplaces (e.g., object data set 30-1 for a traditional fireplace, object data set 30-2 for a fireplace insert, and object data set 30-3 for a free-standing fireplace, in one embodiment).

In various embodiments and/or scenarios, the image processing unit 34 may determine whether an object in the image exactly matches one or more of object data sets 30, determine whether the object in the image is sufficiently "like" or "similar to" one or more of object data sets 30 (e.g., determine whether a threshold correlation metric is exceeded), and/or determine a strength of a match with one or more of object data sets 30 (e.g., determine a correlation metric). In some embodiments, the image processing unit 34 may determine whether a match exists, or a strength of a match, between the object in the submitted image and the object types corresponding to all of the object data sets 30 that are in the same general category (e.g., all fireplaces), and then determines the best match or the best set of matches. In other embodiments, the image processing unit 34 may determine whether a match exists, or a strength of a match, for one object type (e.g., one object data set 30) at a time, until a match is found, or until a match exceeding a threshold strength is found.

Once the object type has been determined for the object in the submitted image, the customer assistance unit 36 may provide an indication of the determined type to the customer. The indication can take various forms according to different embodiments. For example, the customer assistance unit 36 may cause the web browser application 60 to display (via output device 52) the determined type next to the field for which assistance was sought. As another example, the customer assistance unit 36 may cause the field for which assistance was sought to be automatically populated according to the determined type (e.g., by automatically selecting a radio button next to a "free-standing fireplace" option for the field, or automatically inserting the text "free-standing fireplace" in an entry space for the field, etc.). In other example embodiments, the customer assistance unit 36 may cause a pop-up window to appear in the web browser, with the window asking for confirmation of the determined type, or presenting a list of possible types and requesting that the customer select one of the presented types. The field may then be automatically populated with the confirmed (or selected) type, for example.

While operation has been described above primarily with respect to submission of a single image of an object, the customer may, in some embodiments, submit multiple image of the object. The image processing unit 34 may then process each image according to the object recognition technique in order to achieve a greater degree of confidence in a match, for example. Moreover, while operation has been described above with respect to one or more submitted "images," it is understood that the customer may submit video of an object (e.g., as the customer moves around in relation to the object), with the "images" discussed above corresponding to frames of the video.

Further, in some embodiments, the customer enters information in the electronic insurance form 62 not by using web browser application 60, but instead by using a different, downloaded software component stored in program storage 46. For example, client device 12 may be a smartphone of the customer, and program storage 46 may store a smart phone application that was downloaded from computing system 14 via network 16. The application may provide the electronic insurance form 62 to the customer, cause any object images selected by the customer to be sent to computing system 14 via network 16 (e.g., by providing one or more user-interactive controls as described above), and/or cause any information entered in the fields of the electronic insurance form 62 to be posted to the computing system 14 via network 16.

In accordance with another aspect of the invention, the computing system 14 may review insurance records of customers (e.g., policy records stored in data storage 20), and determine when additional information is needed to complete a particular record. For example, a server of computing system 14 may determine (e.g., during the process of attempting to calculate a premium, or during a periodic records review, etc.) that a customer associated with client device 12 still needs to provide information indicating the type of roof on the customer's home. To obtain the missing information, the server may send, via network 16, an email, SMS text message, or other message to client device 12 requesting the missing information. If the customer is uncertain as to his or her roof type, he or she may instead submit an image of the roof to the server. In some embodiments, the server attempts to locate the object image from a different source before, after, or instead of requesting information from the customer. For example, the server may search for images of the relevant object in a database not shown in FIG. 1 (e.g., a database within data storage 20), which may be a repository of images of policyholder homes and/or other properties. The database may include images taken by the customer and provided to the insurance provider, for example. As another example, the server may request the object images from third parties, such as inspection companies or other entities. In an embodiment, the server only attempts to obtain such object images if the customer has already expressly consented to the use of such images for insurance rating and/or pricing purposes. Regardless of the source, the object image may be received/collected by image collection unit 32, and image processing unit 34 and customer assistance unit 36 may then operate in accordance with any of the embodiments discussed above, for example.

In still other embodiments, the output of image processing unit 34 (e.g., data specifying one or more identified objects) may be used for other insurance-related purposes, such as triggering cross-selling opportunities, flagging items to bring them to the attention of underwriting, triggering other insurance-related questions, and/or creating personalized inventory data for the homeowner. If a homeowner submits a picture of his or her house that shows an automobile and/or a boat in the driveway or yard, for example, the computing system 14 (e.g., a unit similar to customer assistance unit 36) may flag a marketing department and/or computer system, and/or the homeowner's agent, to indicate that the homeowner may be a good candidate for auto and/or boat insurance. As another example, if the homeowner submits a picture of his or her house that shows exposed electrical wires or another unsafe condition, the computing system 14 (e.g., a unit similar to customer assistance unit 36) may notify underwriting and/or the homeowner's insurance agent. As still another example, if the homeowner submits one or more pictures of his or her house, the computing system 14 may create a personalized inventory list, and add descriptions and/or images of some or all of the objects identified in the picture(s) (e.g., furniture, appliances, artwork, etc.) to that list. Alternatively, if such a list already exists for the homeowner, the computing system 14 may determine which objects in the picture(s) are not already on the list, and add descriptions and/or images only for those new objects.

III. Exemplary Electronic Insurance Form

FIG. 2 depicts an exemplary electronic insurance form 100 providing for the submission of object images, according to one embodiment. The electronic insurance form 100 may be an on-line form provided to a customer, such as electronic insurance form 62 of FIG. 1, for example. Alternatively, the electronic insurance form 100 may be a form presented by a software application executing on a smartphone or other computing device of a customer. FIG. 2 depicts a part of electronic insurance form 100 as the electronic insurance form 100 might appear within a display of a window or web browser (e.g., a web browser provided by web browser application 60 and displayed on output device 52 of FIG. 1), with a scroll bar being available to view and enter information in the rest of the electronic insurance form 100.

The exemplary electronic insurance form 100 may include at least a set of fields 102A-102E, each of which is associated with both a text-based query directed to the customer filling out the form 100 and an area for the customer to enter responsive information. While FIG. 2 shows that the response is entered by way of a set of discrete radio buttons, other forms may also or instead include blank spaces in which a text answer can be entered for some or all of fields 102A-102E, and/or other suitable mechanisms for entering information.

As seen in FIG. 2, some of fields 102A-102E include not only a question and a response area, but also a virtual button that a customer may activate when in need of assistance. Specifically, in this example, field 102B (inquiring about the customer's fireplace, if any) is associated with a "SHOW US!" button 104-1, and fields 102C and 102D (inquiring about the customer's burglar bars and unrepaired damage, if any) are associated with similar buttons 104-2 and 104-3, respectively. If a customer activates (e.g., clicks on) one of buttons 104-1 through 104-3, he or she may be prompted to enter a filename of an object image, or to navigate directories of his or her computer to select an object image. Once the desired image is selected and/or confirmed by the customer, the image may be sent to the insurance provider (e.g., computing system 14) for processing, as discussed above in connection with FIG. 1. As was also discussed above, the insurance provider (e.g., computing system 14) may respond by automatically populating the response area of the field based upon the recognized object type. Alternatively, text indicating the recognized object type may be displayed in the electronic insurance form 100 next to the appropriate field, or the customer may be prompted to select which of multiple object types that the image matches to some threshold degree should be used to automatically populate the field.

As one example, if the customer is uncertain as to what type of fireplace is in his or her home, and therefore cannot answer the question of field 102B with certainty, he or she may click the button 104-1, and follow any ensuing instructions/prompts to take a picture of the fireplace and submit the picture to a server of the insurance provider (e.g., a server containing or executing image processing unit 34). If the server determines that the pictured fireplace is a fireplace insert, the server may send a command causing the "Yes" response of field 102B to be automatically selected.

As another example, if the customer is uncertain as to whether a metal grate covering his or her windows is considered a set of "burglar bars," and therefore cannot answer the question of field 102C with certainty, he or she may click the button 104-2, and follow any ensuing instructions/prompts to take a picture of the grate and submit the picture to the server of the insurance provider. If the server determines that the pictured grate constitutes burglar bars, the server may send a command causing the "Yes" response of field 102C to be automatically selected.

As another example, if the customer is uncertain as to whether his or her roof should be categorized as "metal" or "tile shingles," and therefore cannot answer the question of field 102E with certainty, he or she may click the button 104-3, and follow any ensuing instructions/prompts to take a picture of the roof and submit the picture to the server of the insurance provider. If the server determines that the pictured roof constitutes a metal roof, the server may send a command causing the "metal" response of field 102E to be automatically selected. In some embodiments, the server only proceeds with automatic population of field(s) 102B, 102C and/or 102E if the match was made with a high level of confidence, and otherwise asks the customer for confirmation of the best match (or informs the customer that no match could be made).

In other embodiments and/or scenarios, a single image may be submitted and processed in order to automatically populate (or otherwise facilitate a customer's entry of information in) two or more fields at once. In still other embodiments and/or scenarios, multiple images and/or images of multiple objects may be submitted in order to automatically populate (or otherwise facilitate a customer's entry of information in) a single field. For example, a first image of a front of an object and a second image of a back of the object may be submitted in order to get assistance with answering a question about the object. As another example, a first image of a first object (e.g., a first fireplace in the home) and a second image of a second object (e.g., a second fireplace in the home) may be submitted in order to get assistance with answering a question about whether the home contains a certain type of object (e.g., in answering the question of field 102B in FIG. 2).

Alternatively, or additionally, the customer may upload all images at a single time, rather than on a question-by-question basis. In some embodiments, the customer may be prompted to upload any images prior to accessing the electronic insurance form 100. In other embodiments, the customer may be prompted to upload any images after accessing the electronic insurance form 100. In some of the latter embodiments, the customer may upload the image(s) by using a control (e.g., interface for selecting image file attachments) provided on a pop-up window that automatically appears when the electronic insurance form 100 is first accessed, upload the image(s) by activating a control provided on the electronic insurance form 200 (not shown in FIG. 2), or in any other suitable manner. In any of these embodiments, the submitted image or images may be processed in order to identify one or more objects in the image(s) (e.g., as discussed above), and the identified object(s) may then be used to determine which questions will be included in the electronic insurance form 100, and/or to determine which response options/values (e.g., which drop-down menu options, etc.) will be available for one or more of the form questions. For example, a question about a fireplace may be added in response to determining that one of the images depicts a fireplace, and/or an option of selecting "stand-alone fireplace" as the fireplace type may be removed in response to determining from one of the images that the fireplace is not a stand-alone fireplace. In some embodiments, if the image(s) provide information sufficient to remove all but one option for responding to a question, the field for that question is automatically populated with the correct answer. By automatically eliminating unnecessary questions and/or response options, the customer may avoid the time and hassle of considering those questions/options, and therefore may have a simplified and streamlined user experience.

In some of the embodiments where the customer may upload all images at a single time, the processing of the image(s) to identify objects, and/or the processing to determine which questions and/or response options to include (and/or to automatically populate response fields), may occur before the customer views the electronic insurance form 100, or may occur in the background while the customer views and/or fills out the electronic insurance form 100. The processing to determine questions and/or response options may be performed by a unit in a server of the insurance provider (e.g., a unit similar to customer assistance unit 36 of FIG. 1), and/or by the customer's computing device (e.g., when web browser application 60 of client device 12 in FIG. 1 interprets scripting language instructions of the electronic insurance form 62), for example.

It is noted that the specific queries, text, appearance, etc., of the electronic insurance form 100 in FIG. 2 may differ according to different embodiments. Moreover, in some embodiments, the electronic insurance form 100 may include more, fewer and/or different fields than are shown in FIG. 2. Further, the buttons 104-1 through 104-3 may have different text (or no text), may be a different type of interactive control (e.g., a blank box for entering a filename of an object image), or may be omitted (e.g., if the electronic insurance form 100 or another interactive display includes a single button or other control for submitting images together rather than on a question-by-question basis).

Figure 3:
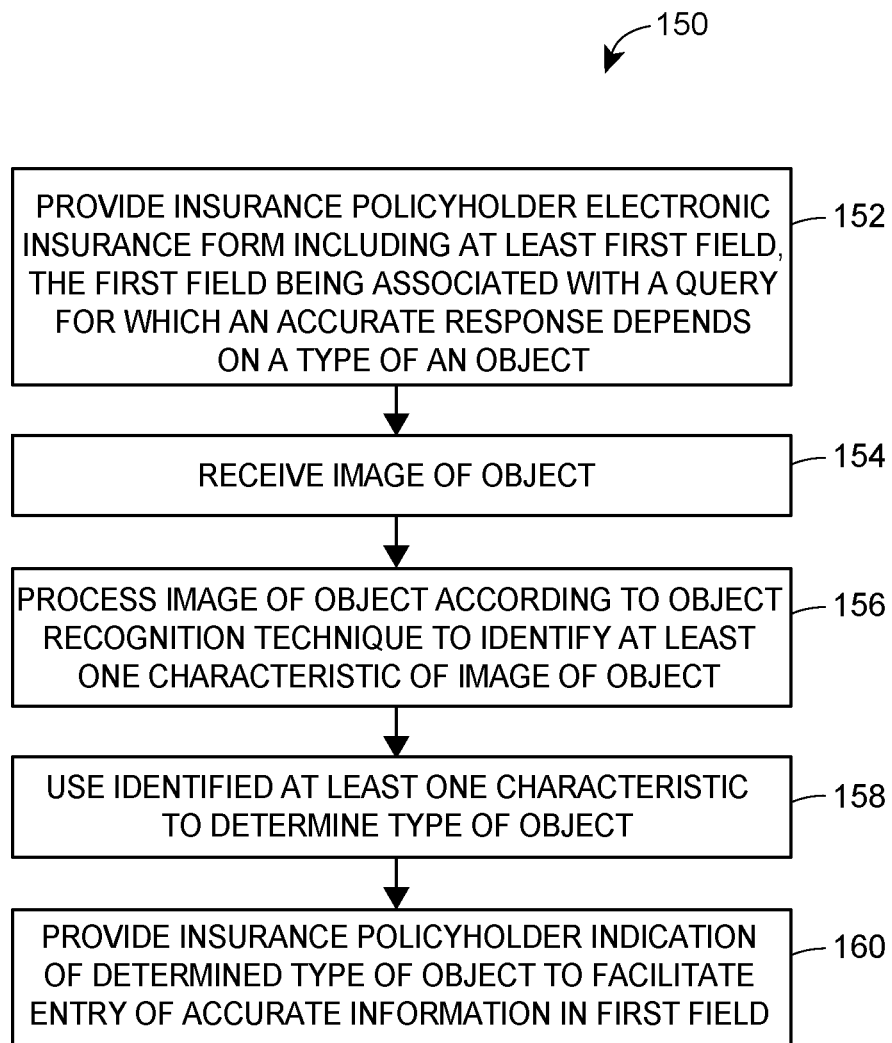
FIG. 3 depicts a flow diagram of an exemplary method for facilitating entry of information into an electronic insurance form, according to an embodiment.

IV. Exemplary Process Flow for Facilitating Entry of Information into an Electronic Insurance Form FIG. 3 depicts a flow diagram of an exemplary method 150 for facilitating entry of information into an electronic insurance form, according to an embodiment. In one embodiment, the method 150 may be implemented in (e.g., performed by one or more processors of) a server or other computer device of a computing system, such as a server or other computer device within computing system 14 of FIG. 1, for example.

In the method 150, an existing or potential insurance policyholder/customer may be provided with an electronic insurance form (block 152). The electronic insurance form may conform to any suitable file format, such as a PDF, HTML or XML-based file format, for example, and may include at least a first field. The first field may be associated with a query for which an accurate response depends upon a type of an object associated with the insurance policyholder. For example, the first field may ask the policyholder whether his or her residence contains a particular type of object (e.g., burglar bars, a particular type of fireplace, etc.), ask the policyholder whether his or her residence is constructed using a particular type of object (e.g., wood shingles, brick veneer, etc.), and/or ask any other question about an object type where the object type is relevant to insurance rating/pricing given the business rules/logic used by the insurance provider to calculate premiums.

In some embodiments, the electronic insurance form may be a form that is made available to the policyholder on-line and includes a set of scripting language instructions, such as JSP instructions, for example. The scripting language instructions may cause a client device to render the electronic insurance form for display to the policyholder when the instructions are interpreted by a web browser application executing on the client device. The scripting language instructions may further cause the client device to display a user-interactive control that is associated with the first field and allows the policyholder to submit an image (e.g., similar to one of buttons 104 in FIG. 2). In other embodiments, the electronic insurance form may be provided by sending a software application to a mobile device (e.g., smartphone) of the policyholder in response to a download request. The software application may, when executed by the mobile device, cause the mobile device to render the electronic insurance form for display to the policyholder. As with the on-line form, the displayed insurance form may include one or more user-interactive controls for submitting images of objects.

An image of the object associated with the policyholder is received (block 154). The image may be received by an image collection unit such as image collection unit 32 of FIG. 1, for example. The image of the object may be received from a client device of the policyholder (e.g., a laptop or desktop computer, a tablet, a smartphone, etc.) via a wireless and/or wired network, for example. If the electronic insurance form includes one or more user-interactive controls, for example, the image may be received via one such control (e.g., via a button or other interactive control specifically tied to a single form question, such as control 104-1 in FIG. 2, or via a single control not tied to any particular question, etc.). Alternatively, the image may be received from a third party, or from a server or database of the insurance provider. In some embodiments and/or scenarios, multiple images of the object may be received, and/or additional images of different objects (which may also be relevant to answering the query of the first field) are received. In some embodiments and scenarios where multiple images of multiple objects are received, the images may be received via multiple controls each tied to a different form question (e.g., two or more of controls 104 in FIG. 2), or may be received via a single control that enables the customer to upload all of the images at one time (e.g., when the electronic insurance form is first accessed, etc.).

The image of the object may be processed according to an object recognition technique in order to identify at least one characteristic of the image (block 156). Block 156 may be performed by an image processing unit such as image processing unit 34 of FIG. 1, for example. The characteristic(s) may be any physical characteristic/property of the image, and may be high-level characteristics that are features of the object in the image (e.g., if a feature-based object recognition technique is used), and/or low-level characteristics that do not attempt to capture specific object features (e.g., if an appearance-based object recognition technique is used). In some embodiments and scenarios using feature-based object recognition, for example, the determined characteristic(s) may include characteristics such as an overall shape of the object or a particular portion of the object, a pattern made by repeating portions of the object, a ratio between two dimensions of the object, a set of colors on the object, a size of the object, a manufacturer of the object, etc. In some embodiments and scenarios using appearance-based object recognition, on the other hand, the determined characteristic(s) may include characteristics such as edge information for the image, image gradients, grayscale information for the image, etc.

The identified characteristic(s) is/are used to determine the type of the object (block 158). Block 158 may be performed by an image processing unit such as image processing unit 34 of FIG. 1, for example. The determination may include a determination of a particular object type (e.g., "free-standing fireplace"), and/or include a determination that is exclusory in nature (e.g., "not a free-standing fireplace"). In some embodiments in which feature-based object recognition is used, the type may be determined using not only the characteristic(s) identified at block 156, but also one or more features known to correspond to a particular type of object. In some embodiments in which appearance-based object recognition is used, the type may be determined using not only the characteristic(s) identified at block 156, but also one or more characteristics of an image of an object that is known to correspond to a particular type of object.

In order to facilitate entry of accurate information in the first field of the electronic insurance form, the policyholder may then be provided an indication of the object type that was determined for the object associated with the policyholder (block 160). The indication may be provided by a customer assistance unit such as customer assistance unit 36 of FIG. 1, for example. The indication may be a text indication of the determined object type that appears next to the first field of the form (or in a pop-up window, etc.), for example. Alternatively, the indication may be provided by automatically populating the first field according to the determined type. In some embodiments, the method 150 may also determine a confidence level associated with the determined object type, and may determine whether that confidence level is above a particular threshold. The first field may be automatically populated in response to determining that the confidence level is above the threshold, for example. In other embodiments, providing the indication may include providing a request for confirmation of the determined object type (e.g., by displaying a text description of the type in a pop-up window along with "confirm" and "cancel" radio buttons), and then automatically populating the first field in response to receiving confirmation of that object type.

In still other embodiments, the characteristic(s) is/are used to determine two or more possible object types at block 158, and providing the indication at block 160 may include providing the policyholder an indication of those possible object types and, in response to receiving a selection by the policyholder or one of the possible object types (e.g., the type that the policyholder believes most accurately describes the object), automatically populating the first field according to the selected object type.

In some embodiments where one or more images are uploaded or otherwise provided in a manner that is not tied to any specific question (e.g., if the customer uploads all images before starting to fill out the form), providing the indication at block 160 may include providing on the electronic insurance form one or more questions that correspond to the type of object that was determined at block 158, and/or may include providing, for a particular form question, one or more response options that correspond to the type of object that was determined at block 158. If it is determined at block 158 that the object is a fireplace, for example, block 160 may include adding to the electronic insurance form a question asking the customer to enter the type of fireplace (or, equivalently, block 160 may include retaining that question in a set of default questions associated with the electronic insurance form). As another example, if it is determined at block 158 that the object is a stand-alone fireplace, block 160 may include adding specific types of stand-alone fireplaces to a list of possible responses to a form question (or, equivalently, block 160 may include removing from the list some or all of the other possible responses to the question, such as "insert fireplace"), and/or block 160 may include automatically populating the response field of the question with "stand-alone" to indicate the fireplace type.

V. Exemplary Method for Completing or Updating an Electronic Insurance Record

Figure 4:
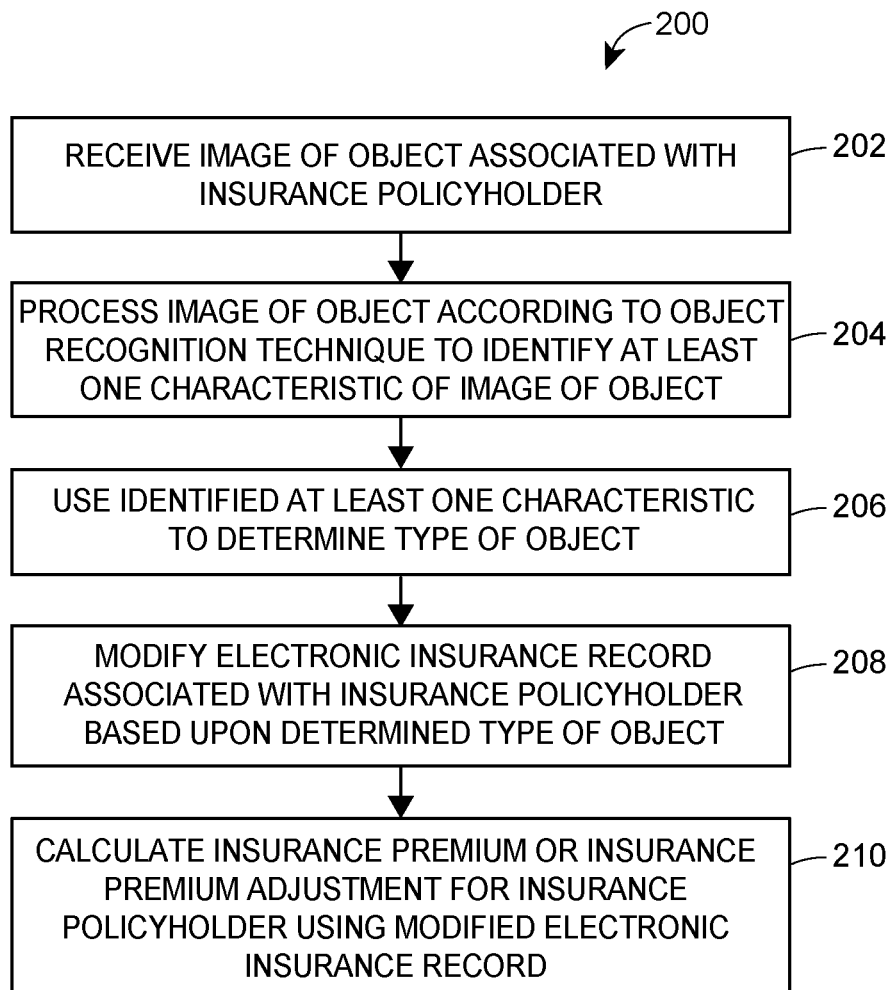
FIG. 4 depicts a flow diagram of an exemplary method for completing or updating an electronic insurance record, according to an embodiment.

FIG. 4 depicts a flow diagram of an exemplary method 200 for completing or updating an electronic insurance record stored in an electronic records database, according to an embodiment. In one embodiment, the method 200 may be implemented in (e.g., performed by one or more processors of) a server or other computer device of a computing system, such as a server or other computer device within computing system 14 of FIG. 1, for example.

In the method 200, an image of an object associated with an existing or potential insurance policyholder/customer may be received (block 202). The image may be received by an image collection unit such as image collection unit 32 of FIG. 1, for example. The image may be an image of an object that is within, or forms a part of, a home/residence (e.g., an interior or exterior wall, a fireplace, burglar bars, a roof, a fuse box, etc.), vehicle, or other property owned and/or possessed by the policyholder, for example. Generally, the object may be any object whose type is relevant to insurance rating/pricing given the business rules/logic used by the insurance provider to calculate premiums. In some embodiments, the method 200 may further include (prior to block 202) providing an electronic insurance form to the policyholder, and the image may be received from the policyholder via a user-interactive control included in the electronic insurance form (e.g., next to a field asking a question about the object). In other embodiments, the method 200 may include (prior to block 202) determining that an electronic insurance record of the policyholder is missing information, or that the record requires updated information, and/or requesting the image of the object in response to that determination (e.g., requesting the image from the policyholder, from a server or database of the insurance provider, or from a third party). In these latter embodiments, the image may then be received in response to the image request.

The received image may be processed according to an object recognition technique to identify at least one characteristic of the image (block 204), and the identified characteristic(s) may be used to determine a type of the object (block 206). Blocks 204 and 206 may be similar to blocks 154 and 156, respectively, of FIG. 3, and may be performed by an image processing unit similar to image processing unit 34 of FIG. 1, for example.

The electronic insurance record of the policyholder may then be modified based upon the determined object type (block 208). The record may be modified to indicate that the policyholder possesses that type of object, for example. In an embodiment, the missing information may be inserted (e.g., the type of fireplace in an insured home, the type of roof in an insured home, etc.), and/or the old information may be updated (e.g., the fireplace type is changed from "traditional" to "insert," the roof type is changed from "wood shingles" to "asphalt shingles," etc.), in an electronic records database according to the determined object type.

An insurance premium for the policyholder, or an adjustment to an insurance premium for the policyholder (e.g., a discount or surcharge), may then be calculated using the modified electronic insurance record (block 210). The premium or premium adjustment may be calculated by a server or other computer device of a computing system, such as a server or other computer device within computing system 14 of FIG. 1, for example. The calculation at block 210 may be made in response to supplying the missing or outdated information at block 208, or may be made at a standard time (e.g., just prior to the next policy term), for example. The insurance policy or premium, or a portion thereof, may then be transmitted and/or presented to the customer or potential customer for their review, approval, and/or modification, such as via wireless communication with their mobile or other computing device.

Figure 5:
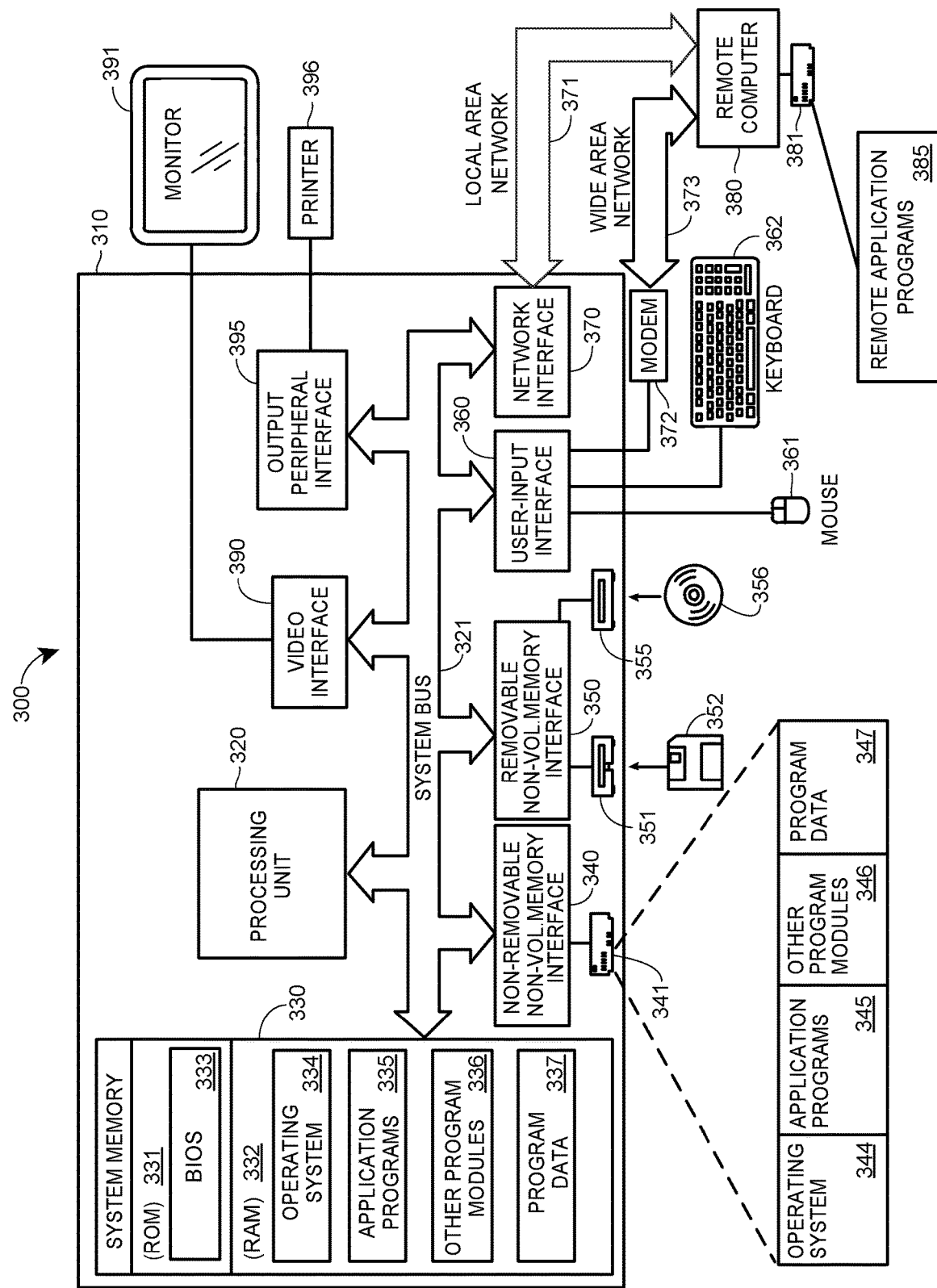
FIG. 5 depicts an exemplary computer system in which the techniques described herein may be implemented, according to an embodiment.

VI. Exemplary Computer System for Facilitating Collection of Insurance Information FIG. 5 depicts an exemplary computer system 300 in which the techniques described herein may be implemented, according to an embodiment. The computer system 300 of FIG. 5 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically may include a variety of computer-readable media. Computer-readable media may be any available media that may be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which may be used to store the desired information and which can accessed by computer 310. Communication media typically may embody computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, may be typically stored in ROM 331. RAM 332 typically may contain data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that may read from or write to non-removable, nonvolatile magnetic media, a magnetic disk drive 351 that may read from or write to a removable, nonvolatile magnetic disk 352, and an optical disk drive 355 that may read from or write to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 may provide storage of computer-readable instructions, data structures, program modules and other data for the computer 310. In FIG. 5, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device may also be connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 may be connected to the LAN 371 through a network interface or adapter 370. When used in a WAN networking environment, the computer 310 typically may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for facilitating the collection of insurance information described above may be implemented in part or in their entirety within a computer system such as the computer system 300 illustrated in FIG. 5. The computer 310 may be a client device of a policyholder/customer (e.g., client device 12 of FIG. 1), for example, and the remote computer 380 may be a server device (e.g., within computing system 14 of FIG. 1) providing the electronic insurance form, for example. In some such embodiments, the LAN 371 may be omitted (e.g., communications may between computer 310 and computer 380 may only occur via WAN 373). Application programs 335 and 345 may include a web browser application (e.g., web browser application 48 of FIG. 1), for example. Remote computer 380 may receive from computer 310 data indicating that a particular electronic insurance form has been selected, and provide the form to the computer 310, for example.

As another example, computer (e.g., server) 380 may receive the object image from computer (e.g., client device) 310 via the WAN 373 (e.g., when the policyholder uses mouse 361 and/or keyboard 362 to select a user-interactive control, displayed by the web browser application on monitor 391, in order to submit the image), process the image using an object recognition technique to determine the object type, and/or provide an indication of the determined object type to computer 310. Computer 380 may provide the indication by sending, via WAN 373, data that causes the web browser application of computer 310 to display the indication to the policyholder on the monitor 391 (e.g., next to the field for which the policyholder sought assistance), for example.

VII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

VIII. Exemplary Method

In one embodiment, a computer-implemented method may include providing, by one or more processors, an existing or potential insurance policyholder an electronic insurance form including at least a first field, the first field being associated with a query for which an accurate response depends upon a type of an object associated with the insurance policyholder. The method may also include receiving an image of the object, processing, by one or more processors, the image of the object according to an object recognition technique to identify at least one characteristic of the image of the object, and/or using, by one or more processors, the identified at least one characteristic to determine the type of the object. The method may include providing, by one or more processors, the insurance policyholder an indication of the determined type of the object to facilitate entry of accurate information in the first field. Additionally or alternatively to providing the indication to the insurance policyholder, the method may include automatically pre-populating, by the one or more processors, the first field in the electronic insurance form based upon the indication of the determined type of the object determined from computer analysis of the image of the object received. The computer-implemented method may include additional, fewer, or alternate actions, including those discussed elsewhere herein.

For instance, processing the image of the object to identify at least one characteristic of the image of the object may include processing the image of the object to identify at least one feature of the object, and/or using the identified at least one characteristic to determine a type of the object may include comparing (i) the identified at least one feature of the object, with (ii) at least one feature known to correspond to a particular type of object, to determine the type of the object.

Using the identified at least one characteristic to determine a type of the object may include comparing (i) the identified at least one characteristic of the image of the object, and (ii) at least one characteristic of an image of an object known to correspond to a particular type of object, to determine the type of the object.

Using the identified at least one characteristic to determine a type of the object may include either (i) determining that the object is a particular type of object, or (ii) determining that the object is not the particular type of object.

Providing the insurance policyholder the electronic insurance form may include providing scripting language instructions that, when interpreted by a web browser application executing on a client device of the insurance policyholder, cause the client device to render the electronic insurance form for display to the insurance policyholder. The scripting language instructions may further cause the client device to display a user-interactive control that is associated with the first field and allows the insurance policyholder to submit an image, and receiving the image of the object may include receiving the image of the object from the insurance policyholder via the user-interactive control.

Providing the insurance policyholder the electronic insurance form may include providing a software application that, when executed by a mobile device of the insurance policyholder, causes the mobile device to render the electronic insurance form for display to the insurance policyholder.

Providing the insurance policyholder an indication of the determined type of the object may include providing the insurance policyholder a text indication of the determined type of the object.

Providing the insurance policyholder an indication of the determined type of the object may include automatically populating the first field.

The method may further include determining, by one or more processors, a confidence level associated with the determined type of the object, and determining, by one or more processors, whether the confidence level is above a threshold. Providing the insurance policyholder an indication of the determined type of the object may include automatically populating the first field in response to determining that the confidence level is above the threshold.

Providing the insurance policyholder an indication of the determined type of the object may include providing the insurance policyholder a request for confirmation of the determined type of the object, and in response to receiving confirmation of the determined type of the object from the insurance policyholder, automatically populating the first field.

Using the identified at least one characteristic to determine a type of the object may include using the identified at least one characteristic to determine two or more possible types of the object, and providing the insurance policyholder an indication of the determined type of the object may include (1) providing the insurance policyholder an indication of the two or more possible types of the object, and (2) in response to receiving a selection by the insurance policyholder of one of the two or more possible types of the object, automatically populating the first field according to the selected one of the two or more possible types of the object.

IX. Exemplary Computer-Readable Medium

In another embodiment, a tangible, non-transitory computer-readable medium stores instructions that, when executed by one or more processors, may cause the one or more processors to provide an existing or potential insurance policyholder an electronic insurance form including at least a first field, the first field being associated with a query for which an accurate response depends upon a type of an object associated with the insurance policyholder. The instructions may also cause the one or more processors to process, according to an object recognition technique, an image of the object to identify at least one characteristic of the image of the object, use the identified at least one characteristic to determine the type of the object, and provide the insurance policyholder an indication of the determined type of the object to facilitate entry of accurate information in the first field.

In some embodiments, the tangible, non-transitory computer-readable medium includes one or more of the following features.

The at least one characteristic of the image of the object may include at least one feature of the object, and the instructions may cause the one or more processors to use (i) the identified at least one feature of the object, and (ii) at least one feature known to correspond to a particular type of object, to determine the type of the object.

The instructions may cause the one or more processors to provide the insurance policyholder the electronic insurance form at least by providing scripting language instructions that, when interpreted by a web browser application executing on a client device of the insurance policyholder, cause the client device to render the electronic insurance form for display to the insurance policyholder.

The instructions may cause the one or more processors to provide the insurance policyholder an indication of the determined type of the object at least by automatically populating the first field.

The instructions may further cause the one or more processors to determine a confidence level associated with the determined type of the object, and determine whether the confidence level is above a threshold. The instructions may cause the one or more processors to provide the insurance policyholder an indication of the determined type of the object at least by automatically populating the first field in response to determining that the confidence level is above the threshold.

X. Another Exemplary Method

In another embodiment, a computer-implemented method may include receiving an image of an object associated with an existing or potential insurance policyholder, processing, by one or more processors, the image of the object according to an object recognition technique to identify at least one characteristic of the image of the object, using, by one or more processors, the identified at least one characteristic to determine a type of the object, modifying, by one or more processors, an electronic insurance record associated with the insurance policyholder based upon the determined type of the object, and/or calculating, by one or more processors, an insurance premium or an insurance premium adjustment for the insurance policyholder using the modified electronic insurance record. The method may include additional, fewer, or alternate actions, including those discussed elsewhere herein.

For instance, the method may further include providing, by one or more processors, the insurance policyholder an electronic insurance form, and receiving the image of the object may include receiving the image of the object from the insurance policyholder via a user-interactive control included in the electronic insurance form.

The method may further include determining, by one or more processors, that the electronic insurance record is missing information or requires updated information, and in response to determining that the electronic insurance record is missing information or requires updated information, requesting, by one or more processors, the image of the object. Receiving the image of the object may be in response to requesting the image of the object.

Processing the image of the object to identify at least one characteristic of the image of the object may include processing the image of the object to identify at least one feature of the object, and using the identified at least one characteristic to determine a type of the object may include using (i) the identified at least one feature of the object, and (ii) at least one feature known to correspond to a particular type of object, to determine the type of the object.

Modifying an electronic insurance record associated with the insurance policyholder based upon the determined type of the object may include modifying the electronic insurance record to indicate that the insurance policyholder possesses the determined type of object.

XI. Exemplary Insurance Quote or Policy Generation

In one aspect, a computer implemented method of providing a home owners insurance quote and/or updating a home owners insurance policy may be provided. The method may include: (1) receiving, at or via a remote server associated with an insurance provider, one or more digital images of a home, the one or more digital images showing one or more characteristics, features, or equipment of the home; (2) analyzing, at or via the remote server, the one or more digital images to automatically extract a home characteristic from the one or more digital images of the home; (3) automatically determining, at or via the remote server, a response to a question within an on-line home owners insurance application (or request for an on-line quote) from (a) the analysis of the one or more digital images, and/or (b) based upon a home characteristic extracted from the one or more digital images; (4) automatically pre-populating, at or via the remote server, the home owners insurance application based upon the response to the question determined by the remote server; (5) automatically generating or adjusting, at or via the remote server, an insurance quote, premium, rate, discount, rebate, or reward for a home owners insurance policy covering the home (based upon the response to the question); and/or (6) causing, at or via the remote server, all or a portion of the home owners insurance policy generated or adjusted (e.g., quote, premium, discount, etc.) to be presented to the customer (such as on their mobile or other computing device) for their review, approval, and/or modification. The method may include additional, fewer, or alternate actions, including those discussed elsewhere herein.

In another aspect, a computer implemented method of providing a home owners insurance quote and/or updating a home owners insurance policy may be provided. The method may include: (1) receiving, at or via a remote server associated with an insurance provider, one or more digital images of a home, the one or more digital images showing one or more characteristics, features, or equipment of the home; (2) analyzing, at or via the remote server, the one or more digital images to automatically extract a home characteristic from the one or more digital images of the home; (3) automatically determining, at or via the remote server, a suggested (or most likely) response to a question within an on-line home owners insurance application (or on-line request for an insurance quote) from (a) the analysis of the one or more digital images, and/or (b) based upon a home characteristic extracted from the one or more digital images; (4) automatically transmitting, at or via the remote server, the suggested response to the question determined by the remote server to the customer for their review and approval (such as on their mobile or other computing device); (5) receiving, at or via the remote server, the customer approval of the suggested response to the question (such as from their mobile or other computing device); (6) automatically pre-populating, at or via the remote server, the on-line home owners insurance application based upon the suggested response to the question that is approved by the customer; (7) automatically generating or adjusting, at or via the remote server, an insurance quote, premium, rate, discount, rebate, or reward for a home owners insurance policy covering the home (based upon the suggested response); and/or (8) causing, at or via the remote server, all or a portion of the home owners insurance policy generated or adjusted (e.g., quote, premium, discount, etc.) covering the home to be presented to the customer (such as on their mobile or other computing device) for their review, approval, and/or modification. The method may include additional, fewer, or alternate actions, including those discussed elsewhere herein.

The characteristics, features, or equipment of the home may be determined from computer analysis of the one or more images of the home and/or associated objects. The computer analysis may be performed (a) at or via an insurance provider remote server, and/or (b) at or via one or more processors that may be associated with the insurance provider or even with the potential or existing insurance customer, including processors within smart home controllers, smart phones or mobile devices, and/or home computers. For home owners insurance, the characteristics, features, or equipment of the home determined from computer analysis may relate to the type of (i) home exterior (brick, masonry, siding, etc.), (ii) home construction (brick patterns, veneer, etc.), (iii) garage (one, two, or three vehicle), (iv) roof (type of shingles, age, etc.) (v) basement (egress windows, size, partially finished, finished, etc.), (vi) fireplace (free standing, insert, etc.), (vii) balcony, (viii) deck, (ix) electrical system (current or voltage ratings, breaker boxes, etc.), (x) windows, (xi) exterior or interior doors, (xii) flooring, (xiii) plumbing, (xiv) heating or furnace, (xv) air conditioning, and/or other home features, including those discussed elsewhere herein, and the amount of home, room, garage, or basement square footage.

Upon reading this disclosure, those of skill in the art will appreciate still additional alternative structural and functional designs for a system and a process of using object recognition to facilitate the collection of insurance information through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method comprising:
providing a user, by one or more processors and via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display within the web browser a user-interactive control that is associated with the first field;
receiving an image of the object that the user submitted via the user-interactive control and the Internet link;
processing, by one or more processors, the image of the object according to an object recognition technique to identify physical features of the object;

using, by one or more processors, the identified physical features to determine two or more possible types of the object, at least by comparing the physical features to physical features known to correspond to the two or more possible types of the object;

determining, by one or more processors, confidence levels associated with the two or more possible types of the object;

providing to the user indications of the two or more possible types of the object, and a request for confirmation of a determined type of the object; and in response to receiving confirmation of the determined type of the object from the user, causing the client device to automatically populate the first field of the electronic form within the web browser in accordance with the determined type.

2. The computer-implemented method of claim 1, wherein causing the client device to automatically populate the first field includes causing the client device to automatically populate the first field with a text indication of the determined type.

3. The computer-implemented method of claim 1, wherein using the identified physical features to determine the two or more possible types of the object includes either (i) determining that the object is a particular type of object, or (ii) determining that the object is not the particular type of object.

4. The computer-implemented method of claim 1, wherein providing the client device software instructions includes providing the client device scripting language instructions to be interpreted by the web browser application executing on the client device.

5. A tangible, non-transitory computer-readable medium storing instructions that, when executed by one or more processors, cause the one or more processors to:

provide a user, via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display within the web browser a user-interactive control that is associated with the first field;

receive an image of the object that the user submitted via the user-interactive control and the Internet link;

process the image of the object according to an object recognition technique to identify physical features of the object;

use the identified physical features to determine two or more possible types of the object, at least by comparing the physical features to physical features known to correspond to the two or more possible types of the object;

determine confidence levels associated with the two or more possible types of the object;

provide to the user indications of the two or more possible types of the object, and a request for confirmation of a determined type of the object; and in response to receiving confirmation of the determined type of the object from the user, cause the client device to automatically populate the first field of the electronic form within the web browser in accordance with the determined type.

6. The tangible, non-transitory computer-readable medium of claim 5, wherein causing the client device to automatically populate the first field includes causing the client device to automatically populate the first field with a text indication of the determined type.

7. The tangible, non-transitory computer-readable medium of claim 5, wherein using the identified physical features to determine the two or more possible types of the object includes either (i) determining that the object is a particular type of object, or (ii) determining that the object is not the particular type of object.

8. The tangible, non-transitory computer-readable medium of claim 5, wherein providing the client device software instructions includes providing the client device scripting language instructions to be interpreted by the web browser application executing on the client device.

9. A system comprising:

one or more processors; and memory storing instructions that, when executed by the one or more processors, cause the system to:

provide a user, via an Internet link, an electronic form including at least a first field, the first field being associated with a query for which an accurate response depends upon a type of an object, wherein providing the user the electronic form includes providing, to a client device of the user, software instructions that, when interpreted by a web browser application executing on the client device, cause the client device to (i) render the form within a web browser of the client device for display to the individual and (ii) display within the web browser a user-interactive control that is associated with the first field, receive an image of the object that the user submitted via the user-interactive control and the Internet link, process the image of the object according to an object recognition technique to identify physical features of the object, use the identified physical features to determine two or more possible types of the object, at least by comparing the physical features to physical features known to correspond to the two or more possible types of the object, determine confidence levels associated with the two or more possible types of the object;

provide to the user indications of the two or more possible types of the object, and a request for confirmation of a determined type of the object, and in response to receiving confirmation of the determined type of the object from the user, cause the client device to automatically populate the first field of the electronic form within the web browser in accordance with the determined type.

10. The system of claim 9, wherein causing the client device to automatically populate the first field includes causing the client device to automatically populate the first field with a text indication of the determined type.

11. The system of claim 9, wherein using the identified physical features to determine the two or more possible types of the object includes either (i) determining that the object is a particular type of object, or (ii) determining that the object is not the particular type of object.

12. The system of claim 9, wherein providing the client device software instructions includes providing the client device scripting language instructions to be interpreted by the web browser application executing on the client device.

\* \* \* \* \*